United States Patent
Nagai et al.

(10) Patent No.: US 6,452,820 B2
(45) Date of Patent: Sep. 17, 2002

(54) POWER SUPPLYING APPARATUS AND METHOD HAVING A PRIMARY SIDE INSULATED FROM A SECONDARY SIDE

(75) Inventors: Tamiji Nagai, Kanagawa; Tamon Ikeda, Tokyo; Kazuo Yamazaki, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/871,080

(22) Filed: May 31, 2001

(30) Foreign Application Priority Data

Jun. 1, 2000 (JP) .................. 2000-164094
Jun. 6, 2000 (JP) .................. 2000-168665

(51) Int. Cl.[7] ............................................. H02M 3/24
(52) U.S. Cl. ............................................. 363/95
(58) Field of Search ..................... 363/95, 97, 98, 363/37, 41

(56) References Cited

U.S. PATENT DOCUMENTS 4,494,178 A * 1/1985 Ishima ..................... 363/37
4,862,338 A * 8/1989 Tanaka ..................... 363/19
5,590,033 A * 12/1996 Kawano .................... 363/25
5,864,110 A * 1/1999 Moriguchi et al. ......... 363/37
6,181,576 B1 * 1/2001 Ikeda et al. ............... 363/17

* cited by examiner

Primary Examiner—Adolf Deneke Berhane
(74) Attorney, Agent, or Firm—Frommer Lawrence & Haug LLP; William S. Frommer; Dennis M. Smid

(57) ABSTRACT

A primary winding T1 and a switching circuit 1 are serially inserted between input terminals Ti1 and Ti2 to which an alternating current is supplied. A diode 2, a resistor 3, and a capacitor 4 are serially inserted in parallel with the primary winding T1. A detecting circuit 5 is connected to both ends of the capacitor 4 and to an emitter and a collector of a phototransistor 7b. A control circuit 6 controls the switching circuit 1. A diode bridge 8 and a capacitor 9 are provided for a secondary winding T2. Output terminals To1 and To2 are connected to both ends of the capacitor 9. A voltage detecting circuit 10 is provided in parallel with the capacitor 9. The voltage detecting circuit 10 detects voltages which are outputted from the output terminals To1 and To2 and supplies the detected voltages to a control circuit 11. The control circuit 11 controls a light emitting diode 7a.

11 Claims, 16 Drawing Sheets

POWER SUPPLYING APPARATUS AND METHOD HAVING A PRIMARY SIDE INSULATED FROM A SECONDARY SIDE

BACKGROUND OF THE INVENTION

1. Field of the Invention

The invention relates to power supplying apparatus and method which can suppress an electric power in what is called a standby mode.

2. Description of the Related Arts

In recent years, a standby mode is provided for a power supplying apparatus, for example, an AC adapter in correspondence to a case where a personal computer or a cellular phone (hereinafter, they are generally referred to as an electronic apparatus) is not connected or, even if it is connected, a power source is hardly consumed. The AC adapter is switched from the standby mode to a supply mode for outputting (consuming) the power source or from the supply mode to the standby mode. At this time, in the standby mode, the operation with a suppressed electric power consumption is performed.

In the standby mode, a signal is transmitted from the secondary side to the primary side and, in the supply mode, the signal which is transmitted from the secondary side to the primary side is stopped. This is because if the signal which is transmitted from the secondary side to the primary side is not transmitted due to some erroneous operation, by operating in the supply mode, a higher safety can be assured.

In recent years, in case of transmitting a signal from the secondary side to the primary side of a transformer, a photocoupler has been used as an example of a feedback circuit whose insulation is held. For example, as shown in FIG. 1, two signals are transmitted from a secondary power source unit 252 to a primary power source unit 251, that is, from the secondary side to the primary side, through photocouplers 253 and 254, respectively. When there are two or more kinds of signals which are transmitted from the secondary side to the primary side as mentioned above, the photocoupler is used in correspondence to each signal.

For example, there is a problem such that in the case where the signal which is transmitted from the secondary side to the primary side is stopped in the standby mode and the signal is transmitted from the secondary side to the primary side in the supply mode, if the signal which is transmitted from the secondary side to the primary side is not transmitted due to some erroneous operation, the operating mode is never set to the supply mode.

However, there is a problem such that an electric power consumption in the standby mode increases due to the photocoupler through which the signal to suppress the electric power consumption is transmitted from the secondary side to the primary side through the photocoupler in the standby mode.

However, since a shape of the photocoupler does not become small, there is a problem such that by using a plurality of photocouplers, a shape of a package of those photocouplers increases.

Further, there is also a problem such that since the signal is transmitted through a portion in an insulated state, if many photocouplers are used, the safety deteriorates.

OBJECTS AND SUMMARY OF THE INVENTION

It is, therefore, the first object of the invention to provide power supplying apparatus and method which can sufficiently suppress an electric power consumption in the standby mode and supply a power source at a predetermined interval.

The second object of the invention is to provide power supplying apparatus and method which can transmit two or more kinds of signals from the secondary side to the primary side by one photocoupler.

According to the first aspect of the invention, there is provided a power supplying apparatus whose primary side and secondary side are insulated, comprising: detecting means for detecting a mode of the secondary side; signal transmitting means for transmitting a detection result of the detecting means to the primary side in the insulated state; and control means for switching a power generating mode and a power stop mode in accordance with the detection result received through the signal transmitting means, wherein the apparatus is controlled so that an operating mode is set to the power generating mode when there is a signal which is transmitted through the signal transmitting means and the operating mode is set to the power stop mode when there is not the signal which is transmitted through the signal transmitting means, and when the power stop mode continues for a long period of time, it is changed to the power generating mode.

According to the second aspect of the invention, there is provided a power supplying apparatus which can perform an intermittent oscillation to suppress an electric power consumption, wherein a primary side has: time constant means which is set to a period longer than a period of the intermittent oscillation; signal transmitting means for transmitting a signal from a secondary side; and switching means for controlling the apparatus so as to perform the intermittent oscillation in response to the received signal, and the secondary side has detecting means for detecting a state of a load which is connected.

According to the third aspect of the invention, there is provided a power supplying method for a power supplying apparatus whose primary side and secondary side are insulated, comprising the steps of: detecting a mode of the secondary side; transmitting a detection result to the primary side in the insulated state; switching a power generating mode and a power stop mode in accordance with the transmitted and received detection result; controlling so that the power generating mode is set when there is a signal which is transmitted through signal transmitting means and the power stop mode is set when there is not the signal which is transmitted through the signal transmitting means; and changing the power stop mode to the power generating mode when the power stop mode continues for a long period of time.

According to the fourth aspect of the invention, there is provided a power supplying method which can perform an intermittent oscillation to suppress an electric power consumption, wherein on a primary side, a time constant is set to a period longer than a period of the intermittent oscillation, a signal which is transmitted from a secondary side is received, and a switching operation is performed so that the intermittent oscillation is performed in response to the received signal, and on the secondary side, a voltage and a current which are outputted are rectified, the voltage and/or the current which are/is outputted are/is detected, the signal is transmitted to the primary side, and the signal to be transmitted is controlled on the basis of the detected voltage and/or the detected current.

As mentioned above, to suppress the electric power consumption, the signal is transmitted in the case where the voltage and/or current which are/is used when the signal is transmitted from the secondary side to the primary side are/is smaller than a reference value(s). By setting the time constant set so as to become the period longer than that of the intermittent oscillation, a power source can be outputted even if the signal which is transmitted from the secondary side to the primary side cannot be transmitted.

According to the fifth aspect of the invention, there is provided a power supplying apparatus whose primary side and secondary side are insulated, comprising: detecting means for detecting a voltage and/or a current of the secondary side; synthesizing means for synthesizing at least two voltages and/or currents; signal transmitting means for transmitting a synthesized synthesis signal to the primary side in the insulated state; separating means for separating at least the two voltages and/or currents from the transmitted and received synthesis signal; and control means for controlling the operation of the primary side in accordance with each of at least the separated two voltages and/or currents.

According to the sixth aspect of the invention, there is provided a power supplying method for a power supplying apparatus whose primary side and secondary side are insulated, comprising the steps of: detecting a voltage and/or a current of the secondary side; synthesizing at least two voltages and/or currents; transmitting a synthesized synthesis signal to the primary side in the insulated state; separating at least the two voltages and/or currents from the transmitted and received synthesis signal; and controlling the operation of the primary side in accordance with each of at least the separated two voltages and/or currents.

According to the seventh aspect of the invention, there is provided a power supplying method for a power supplying apparatus whose primary side and secondary side are insulated, comprising the steps of: detecting a voltage and/or a current of the secondary side; synthesizing at least two voltages and/or currents; transmitting a synthesized synthesis signal to the primary side in the insulated state; separating at least the two voltages and/or currents from the transmitted and received synthesis signal; and switching a power generating mode and a power stop mode in accordance with each of at least the separated two voltages and/or currents.

The synthesis signal obtained by synthesizing at least the two signals (voltages and/or currents) is transmitted and the transmitted synthesis signal is received and, thereafter, the signal can be separated. The power generating mode and the power stop mode can be switched and controlled in accordance with the separated signals. Therefore, the signal can be transmitted by the small number of circuits.

The above and other objects and features of the present invention will become apparent from the following detailed description and the appended claims with reference to the accompanying drawings.

DETAILED DESCRIPTION OF THE PREFERRED EMBODIMENTS

Figure 1:
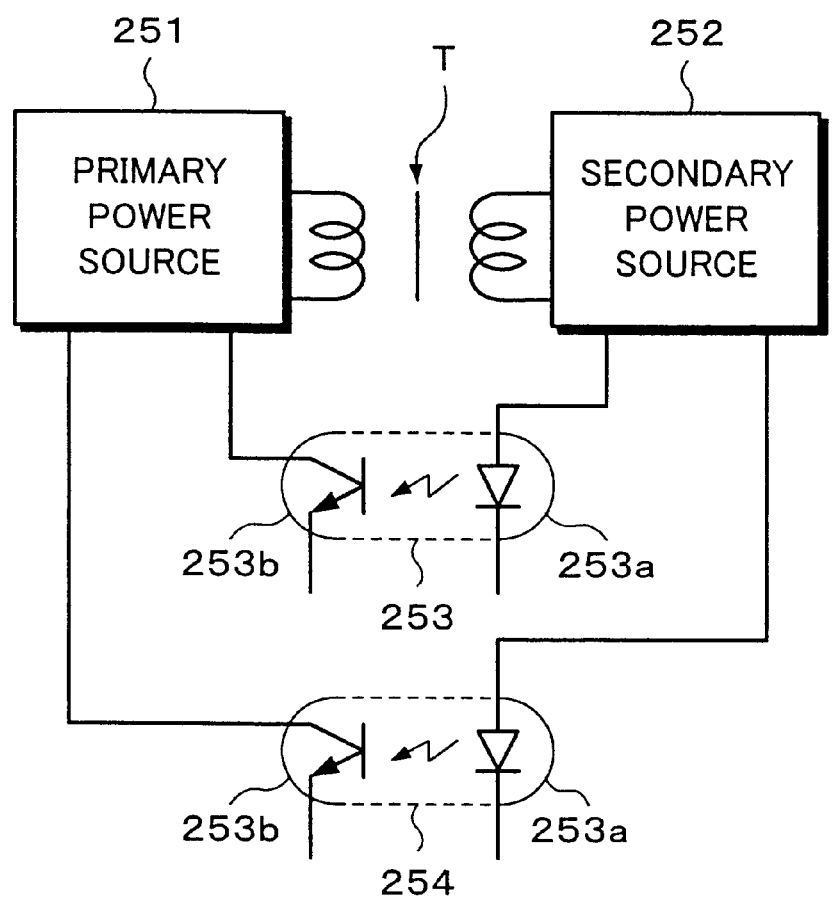
FIG. 1 is a block diagram showing a schematic construction of a related power source unit.
Figure 2:
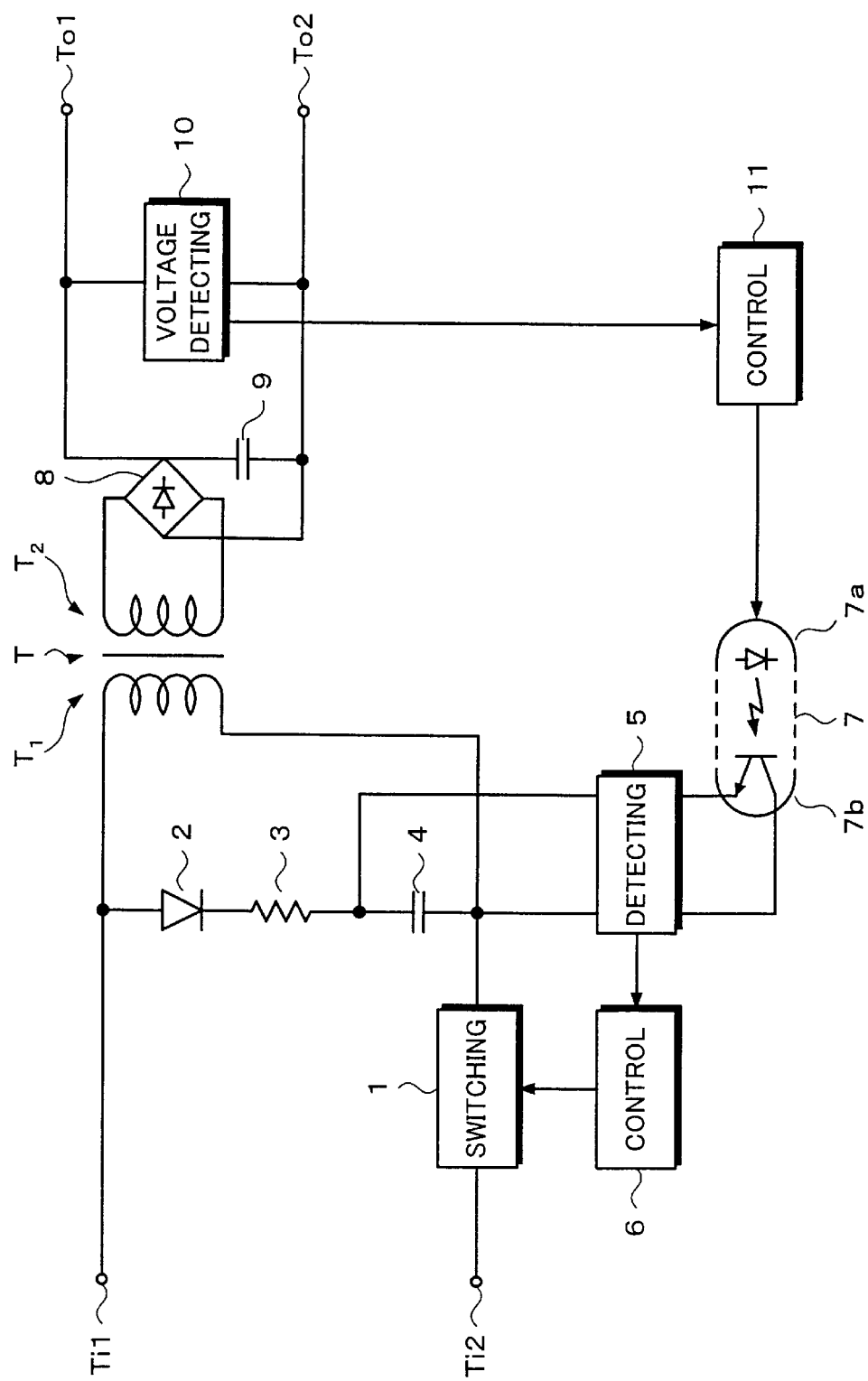
FIG. 2 is a block diagram of the first embodiment to which the first invention can be applied.

An embodiment of the first invention will now be described hereinbelow with reference to the drawings. Component elements having substantially the same effects in each drawing are designated by the same reference numerals and their overlapped descriptions are omitted here. FIG. 2 shows the first embodiment to which the first invention is applied. FIG. 2 relates to an example of what is called an AC adapter for converting an AC power source into a desired voltage and a desired current and outputting. A primary winding T1 of a transformer T and a switching circuit 1 are serially inserted between input terminals Ti1 and Ti2 to which the AC power source is supplied. A diode 2, a resistor 3, and a capacitor 4 constructing a time constant circuit are serially inserted in parallel with the primary winding T1 of the transformer T. A detecting circuit 5 is connected to both ends of the capacitor 4 and connected to an emitter and a collector of a phototransistor 7b of a photocoupler 7. A control circuit 6 controls the switching circuit 1 in accordance with a detection result supplied from the detecting circuit 5.

A diode bridge 8 and a capacitor 9 constructing a rectifying circuit are provided for a secondary winding T2 of the transformer T. The capacitor 9 which is used in the first embodiment is assumed to be a capacitor of a large capacitance. Output terminals To1 and To2 are connected to both ends of the capacitor 9. Further, a voltage detecting circuit 10 is provided in parallel with the capacitor 9. The voltage detecting circuit 10 detects voltages which are outputted from the output terminals To1 and To2. The detected voltages are supplied from the voltage detecting circuit 10 to a control circuit 11. The control circuit 11 controls a light emitting diode 7a of the photocoupler 7 in accordance with the supplied voltages. A load of the electronic apparatus is connected to the output terminals To1 and To2. A charging device for charging a secondary battery is provided in the electronic apparatus main body.

When the operation of the primary side is stopped to stop the supply of the voltage and current, a voltage can be generated for a certain period of time by using the capacitor 9. In the first embodiment, when the voltage of the capacitor 9 is higher than a first reference voltage, for example, 5 V, in order to stop the operation of the primary side, the transmission of a signal from the secondary side to the primary side through the photocoupler 7 is stopped. When the voltage of the capacitor 9 is lower than a second reference voltage, for example, 4 V, in order to make the primary side operative, the signal is transmitted from the secondary side to the primary side through the photocoupler 7.

Therefore, when the voltage of the capacitor 9 is lower than 4 V, the signal is transmitted from the secondary side to the primary side through the photocoupler 7. On the primary side, when a fact that the voltage of the capacitor 9 of the secondary side is lower than 4 V is detected, a control mode is shifted to what is called a supply mode for supplying the voltage and current to the secondary side. When the voltage of the capacitor 9 reaches 5 V, the signal which is transmitted from the secondary side to the primary side through the photocoupler 7 is stopped. As mentioned above, in the first embodiment, the intermittent oscillation can be performed in the standby mode.

An electronic apparatus of a large load electric power is connected to the output terminals To1 and To2 and even if the switching circuit 1 cannot be immediately turned on due to the connection of such an apparatus, the switching circuit 1 can be turned on after the elapse of a time constant Δt comprising the resistor 3 and capacitor 4.

In the first embodiment, when a current I1 flowing in the primary winding T1 of the transformer T is compared with a current I2 flowing in the diode 2, resistor 3, and capacitor 4, there is a relation of I1>I2.

Figure 3:
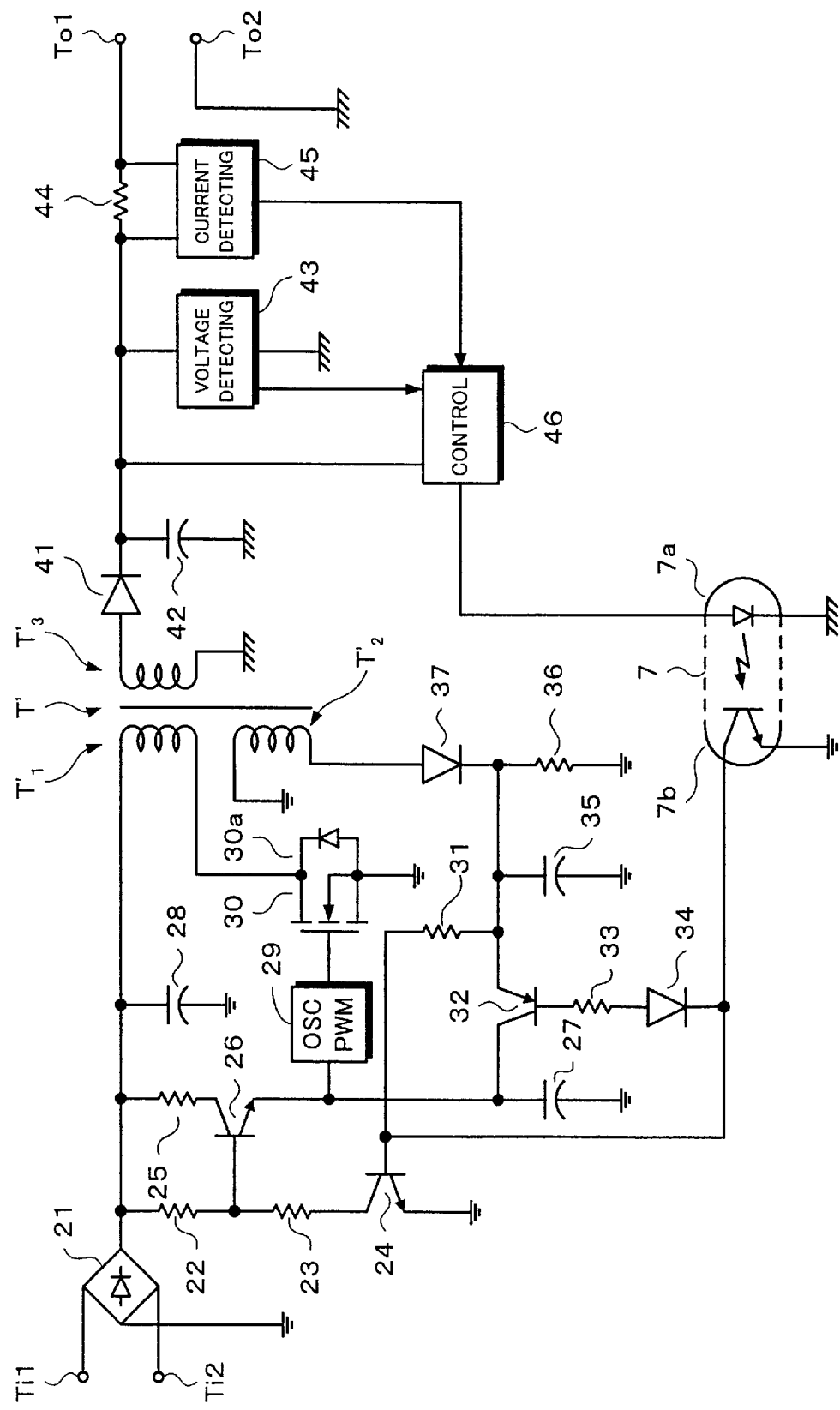
FIG. 3 is a block diagram of the second embodiment to which the first invention can be applied.

FIG. 3 shows the second embodiment of the invention. FIG. 3 shows a power source circuit of a switching type. A diode bridge 21 is provided as a rectifying circuit between the input terminals Ti1 and Ti2. One of outputs of the diode bridge 21 and one end of a primary winding T1' of a transformer T' are connected and the other output is connected to the ground.

Resistors 22 and 23 are inserted between one output of the diode bridge 21 and a collector of an npn-type transistor 24. An emitter of the transistor 24 is connected to the ground and a base is connected to an emitter of a pnp-type transistor 32 through a resistor 31. A resistor 25 is inserted between one output of the diode bridge 21 and a collector of an npn-type transistor 26. A base of the transistor 26 is connected to a node of the resistors 22 and 23 and an emitter is connected to the ground through a capacitor 27. A capacitor 28 is inserted between one output of the diode bridge 21 and the ground.

A collector of the transistor 32 is connected to the emitter of the transistor 26 and a base is connected to an anode of a diode 34 through a resistor 33. A cathode of the diode 34 is connected to the base of the transistor 24. The collector of the phototransistor 7b of the photocoupler 7 is connected to the cathode of the diode 34. The emitter of the phototransistor 7b is connected to the ground.

The emitter of the transistor 26 is connected to an oscillator & pulse width modulating (OSC/PWM) circuit 29. One output of the diode bridge 21 and one end of the primary winding T1' of the transformer T' are connected. An FET 30 is provided between the other end of the primary winding T1' of the transformer T' and the ground. A gate of the FET 30 is connected to the OSC/PWM circuit 29 and its switching operation is controlled by OSC/PWM circuit 29. A parasitic diode 30a is provided for the FET 30.

A rectifying circuit comprising a capacitor 35, a resistor 36, and a diode 37 is provided for a secondary winding T2' of the transformer T'. A cathode of the diode 37 is connected to the emitter of the transistor 32.

A diode 41 and a capacitor 42 constructing a rectifying circuit are provided for a ternary winding T3' of the transformer T'. A cathode of the diode 41 is connected to the output terminal To1 through a resistor 44. The output terminal To2 is connected to the ground.

A control circuit 46 is connected to the cathode of the diode 41. The voltage and current are supplied to the control circuit 46. A voltage detecting circuit 43 detects the voltage which is outputted from the output terminal To1. The detected voltage is supplied to the control circuit 46. A current detecting circuit 45 detects the current which is outputted from the output terminal To1. The detected current is supplied to the control circuit 46. The control circuit 46 supplies the signal to the light emitting diode 7a of the photocoupler 7 on the basis of the supplied voltage and current. The light emitting diode 7a emits light in accordance with the signal which is supplied from the control circuit 46.

The operation of the second embodiment will be described. When the transistor 26 is turned on and performs the switching operation, if there is no load (standby mode), a signal indicative of the absence of the load is supplied from the current detecting circuit 45 to the control circuit 46. The control circuit 46 controls the light emitting diode 7a so as not to emit the light. Therefore, the phototransistor 7b is turned off. The transistor 24 is turned on. The transistors 26 and 32 are turned off. Since the transistor 26 is turned off, the supply of power source to the OSC/PWM circuit 29 is stopped. The operation of the OSC/PWM circuit 29 is stopped.

In an abnormal state where the signal cannot be transmitted to the primary side through the photocoupler 7 due to noises, thunder, or the like, the transistor 24 is turned off and the transistor 26 is turned on by the time constant constructed by the resistor 31 and capacitor 35. Since the transistor 26 is turned on, the power source is supplied to the OSC/PWM circuit 29. The OSC/PWM circuit 29 is made operative.

If a load is connected to the output terminals To1 and To2 (supply mode), a signal indicating that the load has been connected is supplied from the current detecting circuit 45 to the control circuit 46. The control circuit 46 controls the light emitting diode 7a so as to emit the light. Therefore, the phototransistor 7b is turned on. The transistor 24 is turned off. The transistors 26 and 32 are turned on. Since the transistor 26 is turned on, the power source is supplied to the OSC/PWM circuit 29. The OSC/PWM circuit 29 is made operative.

In the voltage detecting circuit 43, whether the detected voltage is out of a desired voltage range or not is discriminated. A signal is supplied to the control circuit 46 so that the voltage lies within the desired voltage range.

Figure 4:
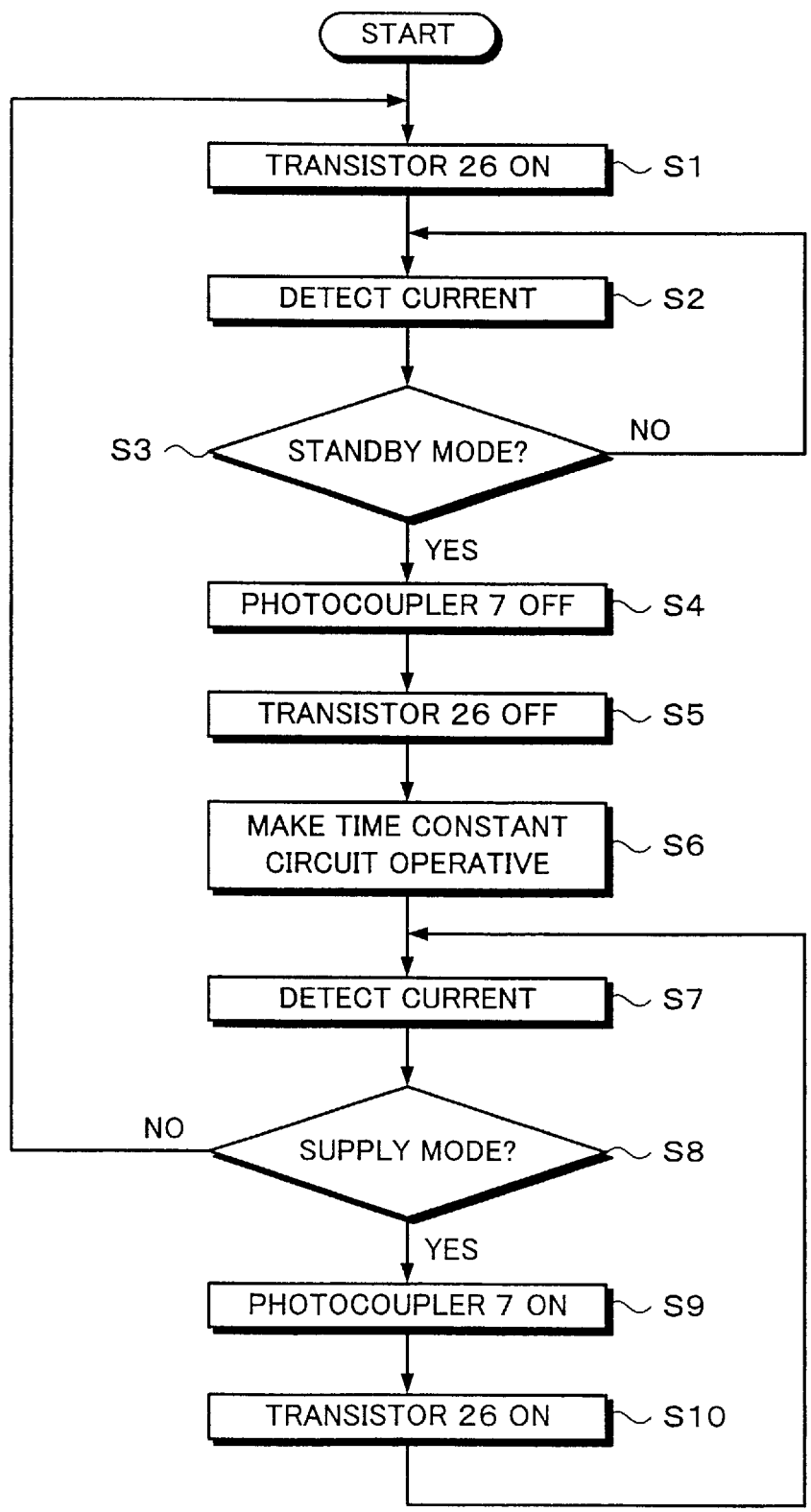
FIG. 4 is a flowchart for explaining the operation of the second embodiment of the first invention.

The operation of the second embodiment will now be described with reference to a flowchart shown in FIG. 4. In step S1, the transistor 26 is turned on. In step S2, the current which is outputted is detected in the current detecting circuit 45. In step S3, whether the operating mode is the standby mode or not is discriminated from the detected current. When the current of a predetermined value or more is detected, it is determined that the operating mode is the supply mode in which the load has been connected. The processing routine is returned to step S2. When the current less than the predetermined value is detected, it is determined that the operating mode is the standby mode in which no load is connected. The processing routine advances to step S4. In step S4, the photocoupler 7 is turned off. In step 5, the transistor 26 is turned off. In step S6, the time constant circuit is made operative.

In step S7, the current which is outputted is detected by the current detecting circuit 45. In step S8, whether the operating mode is the supply mode or not is discriminated from the detected current. When the current of a predetermined value or more is detected, it is determined that the operating mode is the supply mode in which the load has been connected. The processing routine advances to step S9. When the current less than the predetermined value is detected, it is determined that the operating mode is the standby mode in which no load is connected. The processing routine is returned to step S1. In step S9, the photocoupler 7 is turned on. In step S10, the transistor 26 is turned on. The processing routine is returned to step S7.

Figure 5:
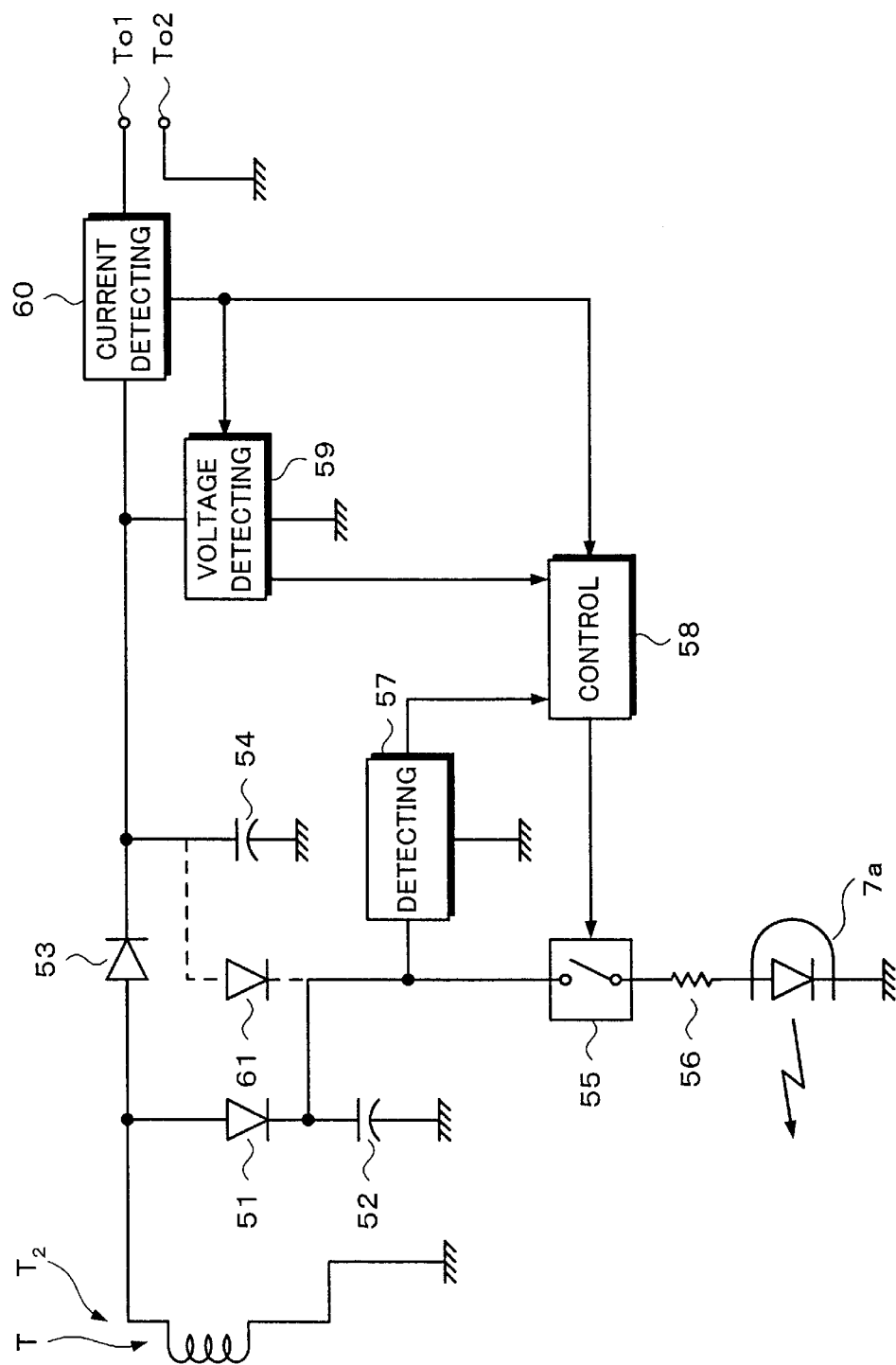
FIG. 5 is a block diagram of the third embodiment to which the first invention can be applied.

FIG. 5 shows the third embodiment of the invention. FIG. 5 shows only the secondary side of the AC adapter. Two rectifying circuits, that is, a rectifying circuit comprising a diode 51 and a capacitor 52 and a rectifying circuit comprising a diode 53 and a capacitor 54 are provided for the secondary winding T2 of the transformer T. A cathode of the diode 51 is connected to an anode of the light emitting diode 7a through a switching circuit 55 and a resistor 56. A detecting circuit 57 is provided between the cathode of the diode 51 and the ground. The detecting circuit 57 detects a voltage which is outputted from this rectifying circuit. The detected voltage is supplied to a control circuit 58. A voltage detecting circuit 59 is provided between a cathode of the diode 53 and the ground. The voltage detecting circuit 59 detects the voltage which is outputted from this rectifying circuit. The detected voltage is supplied to the control circuit 58. The cathode of the diode 53 is connected to the output terminal To1 through a current detecting circuit 60. The current detecting circuit 60 detects the current which is outputted from the output terminal To1. The detected current is supplied to the control circuit 58 and voltage detecting circuit 59.

Whether the operating mode is the supply mode or the standby mode is discriminated by the current detecting circuit 60. When it is determined that the operating mode is the supply mode, the signal is transmitted to the primary side through the control circuit 58 and photocoupler 7 and the voltage and current are outputted. When it is determined that the operating mode is the standby mode, the signal is supplied to the control circuit 58 and voltage detecting circuit 59. The signal which is transmitted to the primary side is stopped. At this time, the voltage (charges) accumulated in the capacitor 52 is detected by the detecting circuit 57. When the detected voltage is equal to a predetermined value or less, the control circuit 58 transmits the signal to the primary side. On the primary side to which the signal has been transmitted, the switching operation is executed and a desired voltage and a desired current are outputted. That is, when the voltage of the capacitor 52 is less than the predetermined value, the signal is transmitted from the secondary side to the primary side and the voltage and current can be outputted.

As mentioned above, in the third embodiment, the second rectifying circuit (diode 51 and capacitor 52) different from the first rectifying circuit (diode 53 and capacitor 54) which is used for supplying the power source to the electronic apparatus is provided. When the voltage of the capacitor 52 constructing the second rectifying circuit is higher than the first reference voltage, for example, 5 V, the switching circuit 55 is turned off, so that the photocoupler 7 is turned off. When it is lower than the second reference voltage, for example, 4 V, the switching circuit 55 is turned on, so that the photocoupler 7 is turned on. As mentioned above, since the signal indicative of the drop of the power source is transmitted to the primary side, the primary side detects the drop of the power source of the capacitor and the signal is transmitted to the primary side. That is, in the third embodiment, the intermittent oscillation is performed in accordance with the voltage of the capacitor 52.

As shown by a broken line in FIG. 5, an anode of a diode 61 can be connected to the cathode of the diode 53 and a cathode of the diode 61 can be connected to the cathode of the diode 51.

In the third embodiment, although a detection result of the detecting circuit 57 and a detection result of the voltage detecting circuit 59 are supplied to the control circuit 58, one of them can be also supplied to the control circuit 58.

Further, in case of the transformer T' shown in FIG. 3 mentioned above, after the stop of the switching operation, it can be also reactivated after the elapse of the time constant Δt. In this instance, it is also possible to rectify pulses which are generated in the secondary winding T2' or primary winding T1' and use them. A pulse voltage which is generated in a coil of the primary side can be also used.

When the apparatus enters a state similar to a state where the output terminals To1 and To2 are short-circuited, the capacitor 54 instantaneously discharges. In the third embodiment, however, the signal can be transmitted from the secondary side to the primary side by using the capacitor 52. At this time, since it is desired to reduce an electric power consumption in the standby mode, there is no need to output the voltage and current from the output terminals To1 and To2, so that the signal cannot be transmitted to the primary side by using the capacitor 54.

Figure 6:
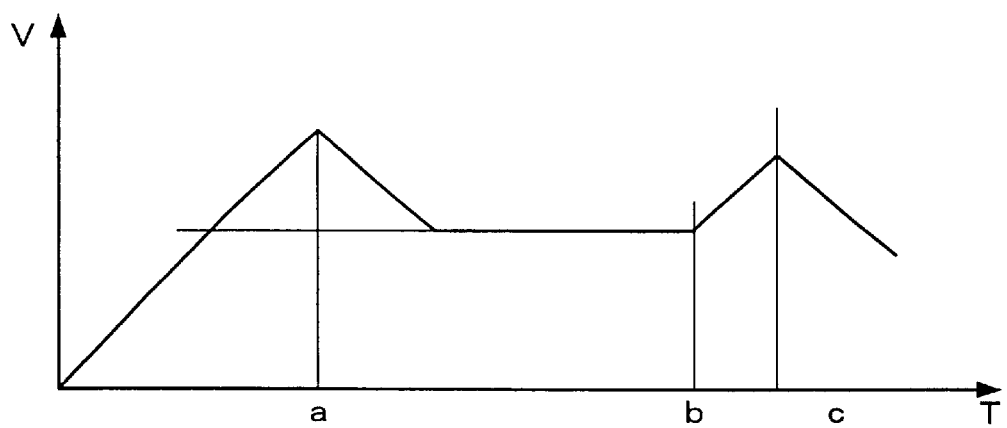
FIG. 6 is a characteristic diagram of an example for explaining voltage characteristics according to the first invention.

It is also possible to control the apparatus in a manner such that the turn-off of the transistor 26 on the primary side is detected and, after the elapse of the time constant Δt, the transistor 26 is turned on. For example, as shown in FIG. 6, the transistor 26 is turned off at a time point a and the transistor 26 is subsequently turned on at a time point b after the elapse of the time constant Δt. The transistor 26 is turned off at a time point c.

Figure 7:
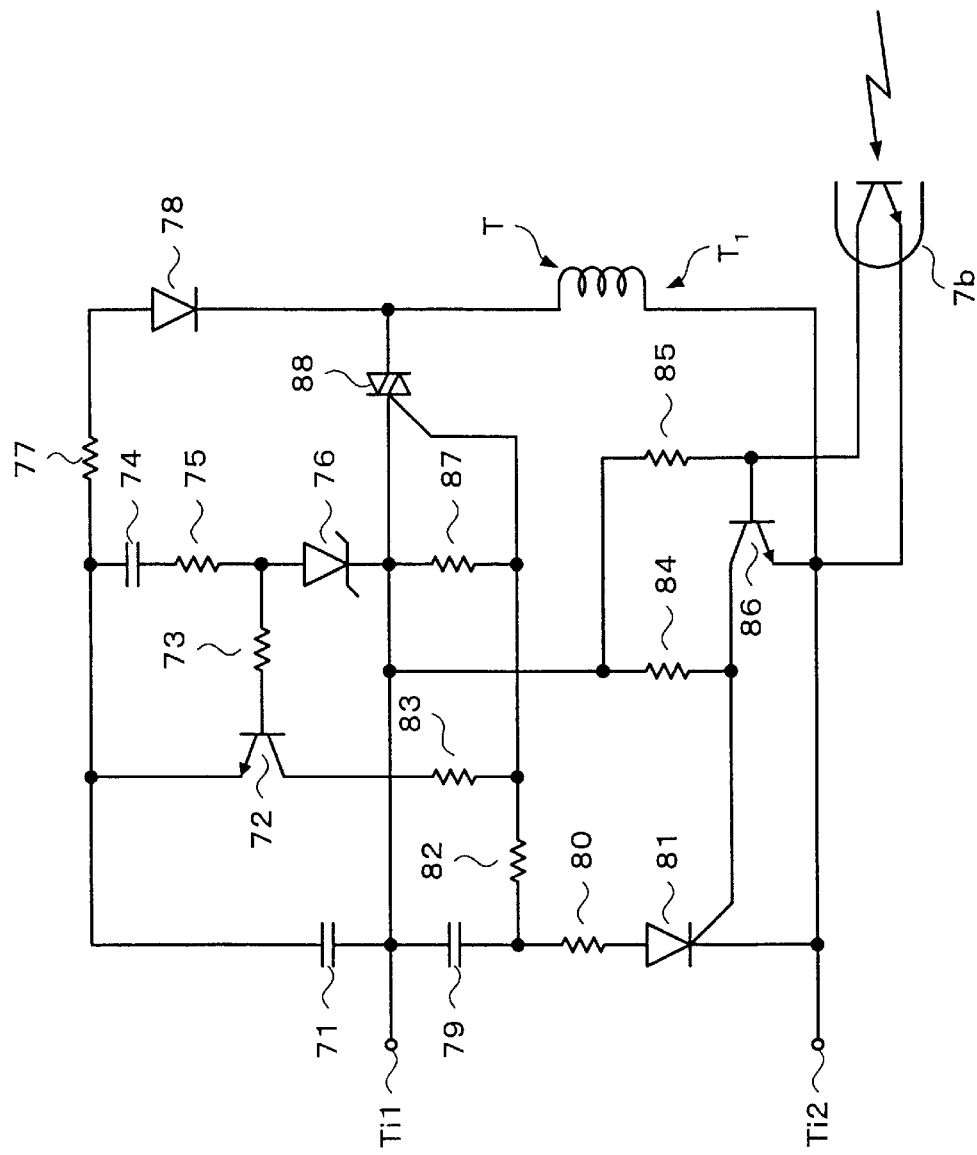
FIG. 7 is a block diagram of the fourth embodiment to which the first invention can be applied.

FIG. 7 shows the fourth embodiment of the invention. FIG. 7 shows only the primary side of the AC adapter and relates to an example in which a triac is used on the primary side. A capacitor 71 and a resistor 77 constructing a time constant circuit are provided between the input terminal Ti1 and an anode of a diode 78. A node of the capacitor 71 and resistor 77 is connected to an emitter of an npn-type transistor 72. Resistors 73 and 75 and a capacitor 74 are serially inserted between a base and the emitter of the transistor 72. A collector of the transistor 72 is connected to a gate of a triac 88 through a resistor 83. A node of the resistors 73 and 75 is connected to an anode of a Zener diode 76. A cathode of the Zener diode 76 is connected to one terminal of the triac 88. One terminal of the triac 88 is connected to the input terminal Ti1. A resistor 87 is inserted between one end of the triac 88 and its gate. The other terminal of the triac 88 is connected to a cathode of the diode 78.

A capacitor 79 and a resistor 80 are serially inserted between the input terminal Ti1 and an anode of a thyristor 81. A cathode of the thyristor 81 is connected to the output terminal Ti2 and a gate is connected to a collector of an npn-type transistor 86. A resistor 82 is inserted between a node of the capacitor 79 and resistor 80 and the gate of the triac 88. A resistor 84 is inserted between the collector of the transistor 86 and the input terminal Ti1. A resistor 85 is inserted between a base of the transistor 86 and the input terminal Ti1. An emitter of the transistor 86 is connected to the input terminal Ti2. The collector of the phototransistor 7b is connected to the base of the transistor 86 and the emitter is connected to the input terminal Ti2. The primary winding T1 of the transformer T is provided between the other terminal of the triac 88 and the input terminal Ti2.

According to the fourth embodiment, when the phototransistor 7b is turned on, the transistor 86 is turned off and the thyristor 81 is turned on. Since the thyristor 81 is turned on, the triac 88 is turned on. When the phototransistor 7b is turned off, the transistor 86 is turned on and the thyristor 81 is turned off. Since the thyristor 81 is turned off, the triac 88 is turned off.

After the triac 88 was changed from ON to OFF, the Zener diode 76 is turned on after the expiration of the time constant set by the time constant circuit comprising the capacitor 71 and resistor 77 and the time constant set by the time constant circuit comprising the capacitor 74 and resistor 75. When the Zener diode 76 is turned on, the transistor 72 is turned on and the triac 88 is turned on. That is, the capacitor 71 is charged through the diode 78. Similarly, the capacitor 74 is also charged. When the capacitor 74 is charged to a predetermined value, the Zener diode 76 is turned on.

Figure 8:
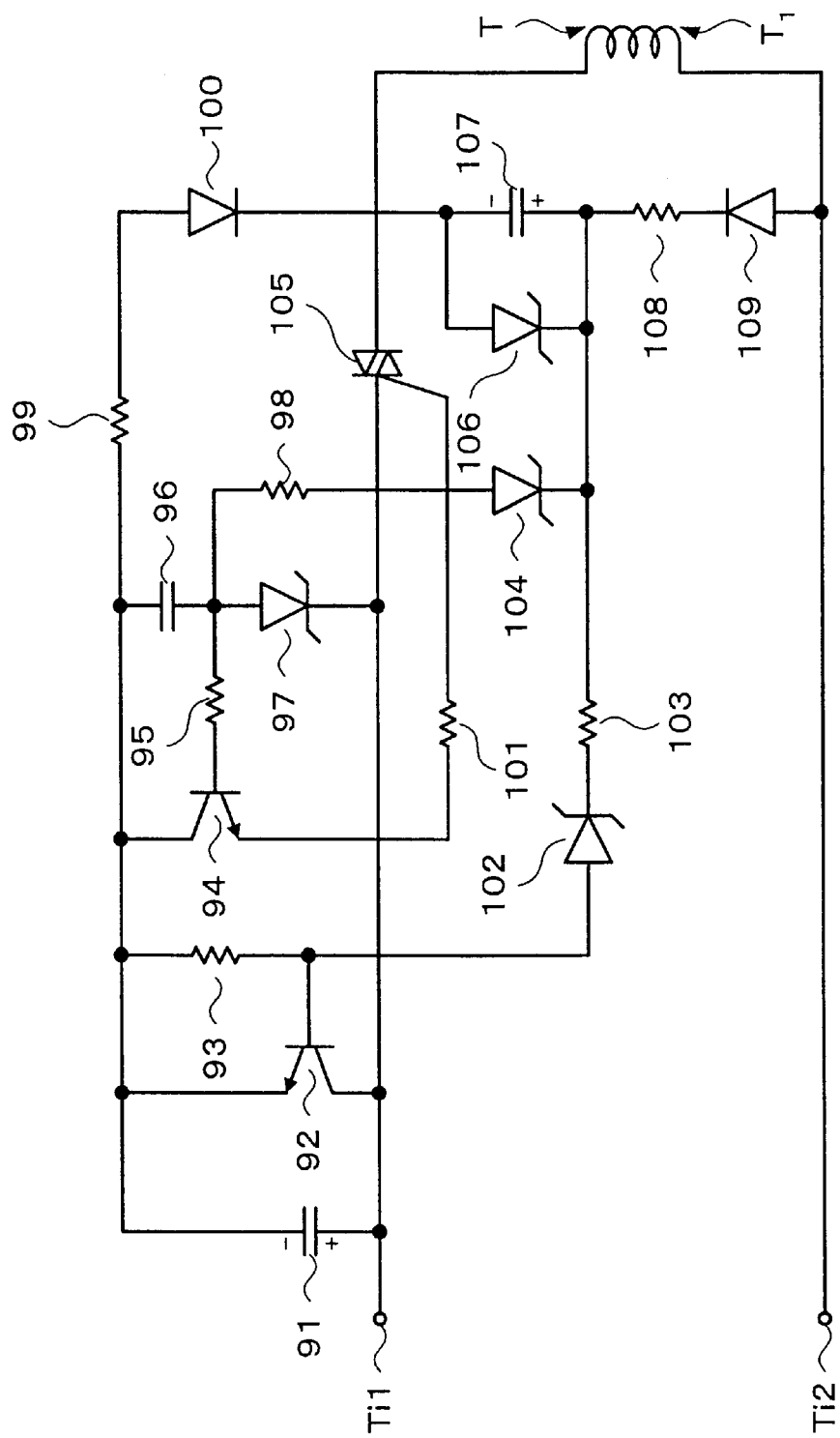
FIG. 8 is a block diagram of another example of the fourth embodiment to which the first invention can be applied.

FIG. 8 shows another example of the fourth embodiment. FIG. 8 shows only the primary side of the AC adapter. The input terminal Ti1 is connected to one terminal of a triac 105. A capacitor 91 and a resistor 99 are serially inserted between one terminal of the triac 105 and an anode of a diode 100. A node of the capacitor 91 and resistor 99 is connected to an emitter of an npn-type transistor 92. A collector of the transistor 92 is connected to one terminal of the triac 105. A resistor 93 is inserted between a base and the emitter of the transistor 92. The base of the transistor 92 is connected to an anode of a Zener diode 102.

A collector of an npn-type transistor 94 is connected to the emitter of the transistor 92 and an emitter is connected to a gate of the triac 105 through a resistor 101. A resistor 95 and a capacitor 96 constructing a time constant circuit are inserted between a base and the emitter of the transistor 94. A node of the resistor 95 and capacitor 96 is connected to an anode of a Zener diode 97. a cathode of the Zener diode 97 is connected to one terminal of the triac 105. The anode of the Zener diode 97 is connected to an anode of a Zener diode 104 through a resistor 98.

A cathode of the Zener diode 102 is connected to a cathode of the Zener diode 104 through a resistor 103. The cathode of the Zener diode 104 is connected to a cathode of a Zener diode 106. An anode of the Zener diode 106 is connected to the other terminal of the triac 105 and a cathode of the diode 100. The Zener diode 106 is provided in parallel with a capacitor 107. A resistor 108 is inserted between the cathode of the Zener diode 106 and a cathode of a diode 109. An anode of the diode 109 is connected to the input terminal Ti2. The primary winding T1 of the transformer T is provided between the other terminal of the triac 105 and the input terminal Ti2.

A Zener voltage V102 of the Zener diode 102 and a Zener voltage V104 of the Zener diode 104 or a Zener voltage V106 of the Zener diode 106 are selected so as to satisfy the relation V102>V104 (or V106).

Figure 9:
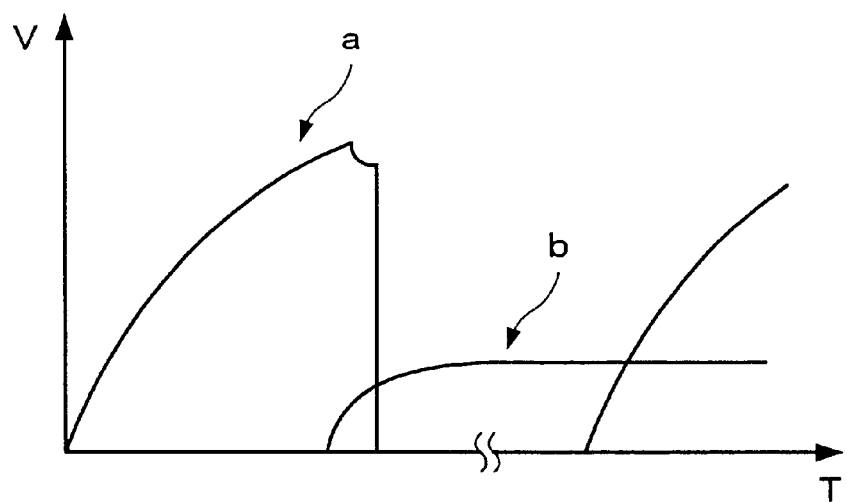
FIG. 9 is a characteristic diagram of an example for explaining voltage characteristics according to the first invention.

When the triac 105 is turned on, a voltage is outputted from the capacitor 107. When the voltage which is outputted from the capacitor 107 is equal to the Zener voltage V102 or more, the Zener diode 102 is turned on and the capacitor 107 is discharged. For example, voltage characteristics of the capacitor 91 are shown by characteristics a in FIG. 9 and voltage characteristics of the capacitor 107 are shown by characteristics b in FIG. 9.

The operation of the fourth embodiment will now be described. First, since the triac 105 is turned off, the voltage and current are supplied to the primary winding T1 of the transformer T through the capacitor 91, resistor 99, and diode 100. At this time, the capacitor 91 is charged. At the same time, when the voltage of the capacitor 96 constructing the time constant circuit exceeds the Zener voltage of the Zener diode 97, the Zener diode 97 is turned on. When the Zener diode 97 is turned on, the transistor 94 is turned on. Since the transistor 94 is turned on, the voltage of the capacitor 91 is supplied to the gate of the triac 105 and the triac 105 is turned on. Since the triac 105 is turned on, the charging of the capacitor 91 is stopped.

Since the triac 105 is turned on, the voltage and current are supplied through the diode 109, resistor 108, capacitor 107, and triac 105. In this instance, the capacitor 107 is charged. At this time, since the Zener diode 104 is turned on, the ON state of the transistor 94 is held. The transistor 92 is turned on by the diode 109. When the transistor 92 is turned on, the capacitor 91 is discharged. When the capacitor 91 is discharged and the voltage of the capacitor 91 is lower than the voltage adapted to turn on the triac 105, the triac 105 is turned off.

As mentioned above, the switching operation is performed, it is detected that the operating mode is the standby mode, and the switching operation is performed again after the elapse of the time constant At set by the timer or the CR time constant.

Figure 10:
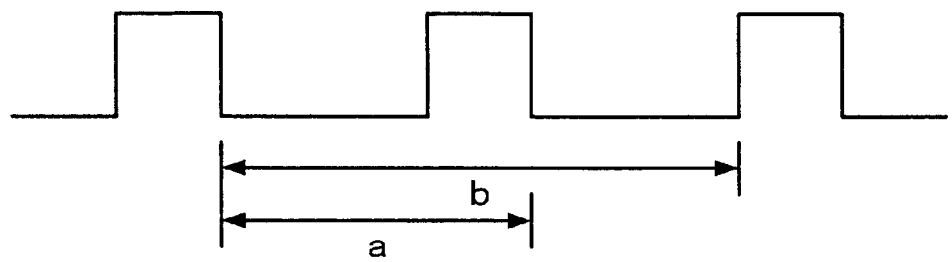
FIG. 10 is a schematic diagram of an example for explaining a timing according to the first invention.

In the fourth embodiment, as shown in FIG. 10, a period Tb of the automatic reactivation by an automatic reactivating timer or the time constant is selected so as to be longer than a period Ta set by the low oscillation or the timer. For example, when the period Ta is assumed to be 10 seconds, the period Tb is set to 15 to 20 seconds. As mentioned above, since the reactivating period is set to be longer than the period of time from a point when the operating mode is changed from the supply mode to the standby mode to a point when the operating mode is set to the supply mode again, even if the signal is not transmitted from the secondary side to the primary side due to the erroneous operation, the primary side can be made operative to supply the voltage and current.

In the foregoing embodiment, for example, when the voltage of the capacitor exceeds 5 V, the output of the supplied power source is stopped, and when the voltage of the capacitor is lower than 4 V, the signal is transmitted from the secondary side to the primary side so as to supply the power source. However, a secondary battery can be also used in place of the capacitor. In case of using the secondary battery, for example, when a voltage of the secondary battery exceeds 4.5 V, the output of the supplied power source is stopped, and when the voltage of the secondary battery is lower than 2.5V, the signal is transmitted from the secondary side to the primary side so as to supply the power source.

Figure 11:
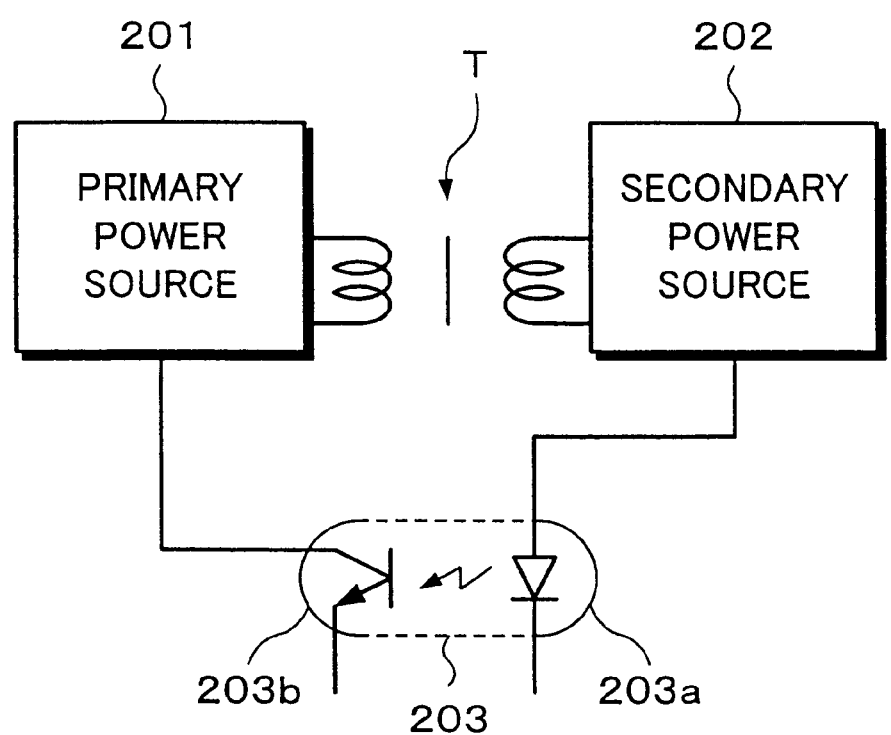
FIG. 11 is a block diagram showing a schematic construction to which the second invention is applied.

An embodiment of the second invention will now be described hereinbelow with reference to the drawings. Component elements having substantially the same effects in each drawing are designated by the same reference numerals and their overlapped descriptions are omitted here. FIG. 11 shows a whole construction to which the invention is applied. The primary winding T1' of the transformer T is connected to a primary power source unit 201 and the secondary winding T2' is connected to a secondary power source unit 202. A signal for allowing a light emitting diode 203a of a photocoupler 203 to emit light is supplied from the secondary power source unit 202 to the light emitting diode 203a. When the light emitting diode 203a emits the light, a phototransistor 203b of the photocoupler 203 is turned on. A signal which is generated due to the turn-on of the phototransistor 203b is received by the primary power source unit 201. At this time, at least two kinds of signals are transmitted from the secondary side to the primary side.

Figure 12:
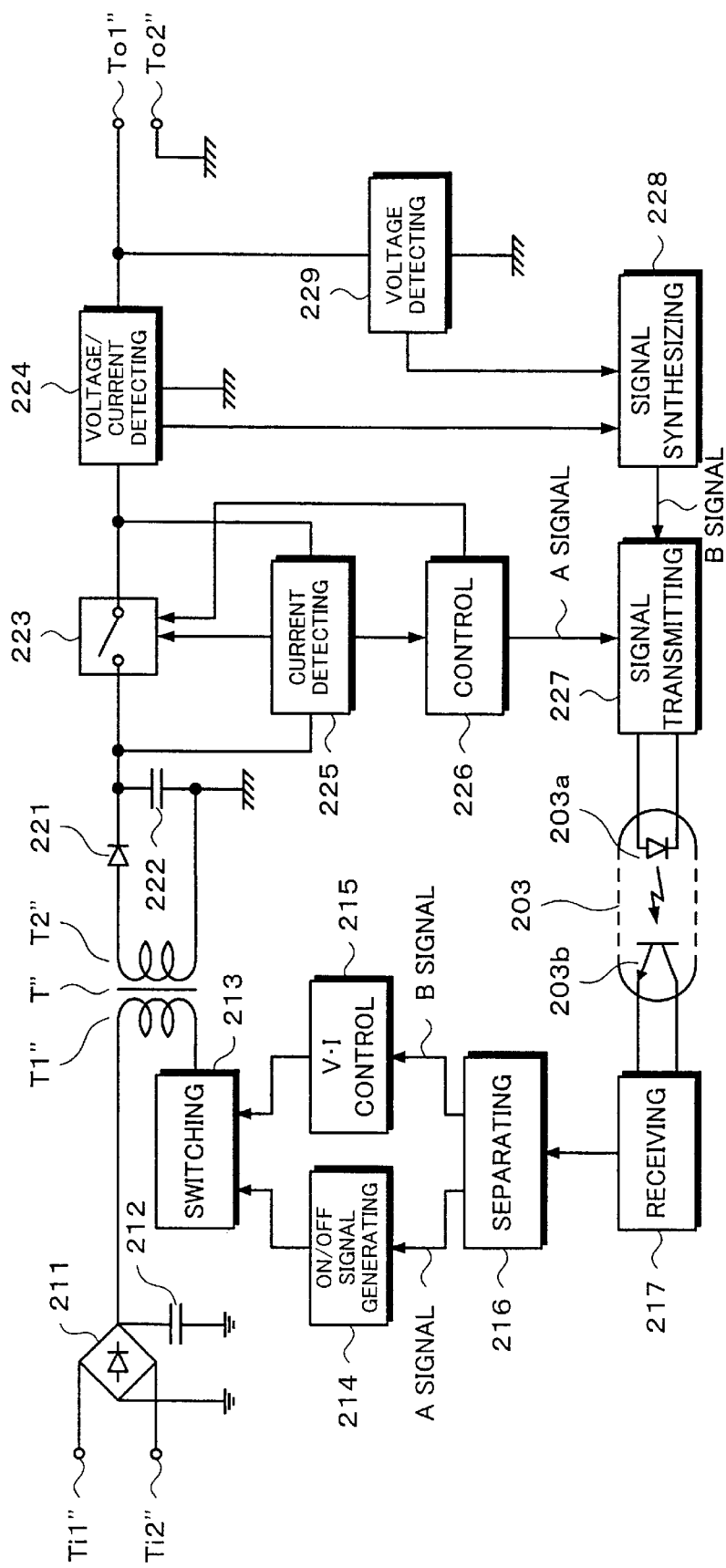
FIG. 12 is a block diagram of an embodiment to which the second invention is applied.

An embodiment of the invention will now be described with reference to FIG. 12. A power source is supplied from input terminals Ti1" and Ti2". The supplied power source is connected to a primary winding T1" of a transformer T" through a rectifying circuit comprising a diode bridge 211 and a capacitor 212. A switching unit 213 is provided for the primary winding T1".

A receiving circuit 217 receives a signal which is generated due to the turn-on of the phototransistor 203b. The receiving circuit 217 supplies the received signal to a separating circuit 216. The separating circuit 216 discriminates whether the supplied signal is a signal which is supplied to an on/off signal generating circuit 214 or a signal which is supplied to a voltage/current control circuit 215. If it is determined that it is the signal which is supplied to the on/off signal generating circuit 214, the signal is supplied from the separating circuit 216 to the on/off signal generating circuit 214. If it is determined that it is the signal which is supplied to the voltage/current control circuit 215, the signal is supplied from the separating circuit 216 to the voltage/current control circuit 215.

In the on/off signal generating circuit 214, a signal to turn on or off the switching unit 213 is supplied to the switching unit 213 in response to the signal supplied from the separating circuit 216. In the voltage/current control circuit 215, a signal to control a duty ratio of the switching unit 213 is supplied to the switching unit 213 in response to the signal supplied from the separating circuit 216.

A rectifying circuit comprising a diode 221 and a capacitor 222 is provided for the secondary winding T2" of the transformer T. A switching circuit 223 and a voltage/current detecting circuit 224 are provided between a cathode of the diode 221 and an output terminal To1". The output terminal To2" is connected to the ground. A current detecting circuit 225 is provided in parallel with the switching circuit 223. The current detecting circuit 225 detects a current which is outputted from the output terminal To1". The detected current is supplied from the current detecting circuit 225 to a control circuit 226. The on/off operation of the switching circuit 223 is controlled in accordance with the detected current. The control circuit 226 controls the on/off operation of the switching circuit 223 in accordance with the current from the current detecting circuit 225. The signal is supplied from the control circuit 226 to a signal transmitting circuit 227.

The voltage/current detecting circuit 224 detects the voltage and/or the current which are/is outputted from the output terminal To1". The detected voltage and/or the current are/is supplied from the voltage/current detecting circuit 224 to a signal synthesizing circuit 228. A voltage detecting circuit 229 is provided between the output terminal To1" and the ground and detects the voltage which is outputted from the output terminal To1". The detected voltage is supplied from the voltage detecting circuit 229 to the signal synthesizing circuit 228. The voltage detecting circuit 229 is used in the standby mode in which the circuit itself stops the operation or at the time of discriminating whether the load has been connected or not.

The signal synthesizing circuit 228 synthesizes the voltage and/or the current from the voltage/current detecting circuit 224 and the voltage from the voltage detecting circuit 229 and supplies a synthesized voltage to the signal transmitting circuit 227. The signal transmitting circuit 227 outputs a signal to the light emitting diode 203a on the basis of the signal from the control circuit 226 and the signal from the signal synthesizing circuit 228. The light emitting diode 203a emits the light on the basis of the signal which is supplied from the signal transmitting circuit 227. When the light emitting diode 203a emits the light, the phototransistor 203b is turned on and the signal is received by the receiving circuit 217.

Figure 13:
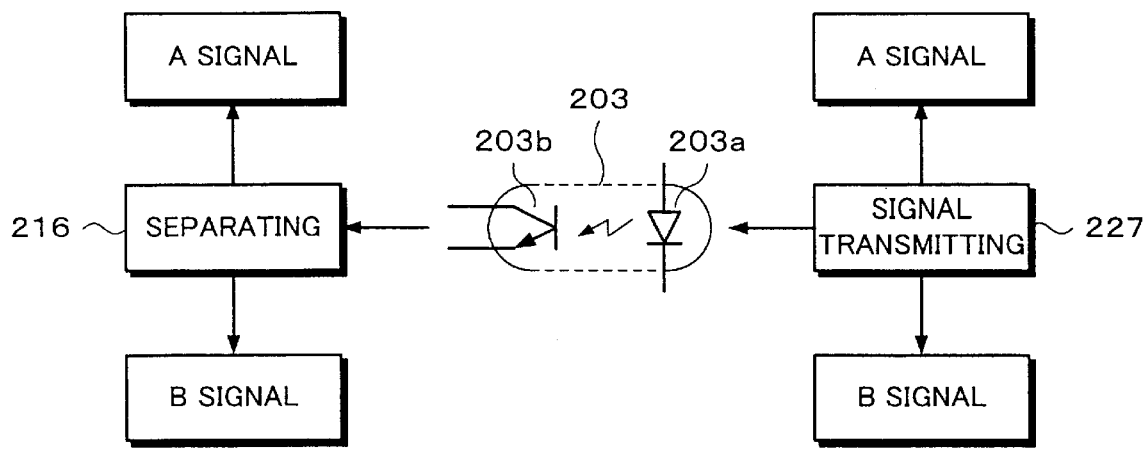
FIG. 13 is a schematic diagram for explaining the second invention.

FIG. 13 shows a schematic diagram in the case where the signals are synthesized and transmitted and the transmitted signal is separated. For example, an A signal is supplied from the control circuit 226 to the signal transmitting circuit 227 and a B signal is supplied from the signal synthesizing circuit 228 to the signal transmitting circuit 227. The signal transmitting circuit 227 supplies a synthesis signal obtained by synthesizing the A signal and the B signal to the light emitting diode 203a. The light emitting diode 203a emits the light in accordance with the supplied synthesis signal. The phototransistor 203b is turned on or off in accordance with the light emission of the light emitting diode 203a. Since the phototransistor 203b is turned on or off, the transmitted synthesis signal is received by the receiving circuit 217. The received synthesis signal is supplied to the separating circuit 216. The separating circuit 216 separates the supplied synthesis signal into the A signal and the B signal. The separated A signal is supplied to the on/off signal generating circuit 214. The separated B signal is supplied to the voltage/current control circuit 215. As mentioned above, two signals can be transmitted from the secondary side to the primary side by one photocoupler.

Figure 14:
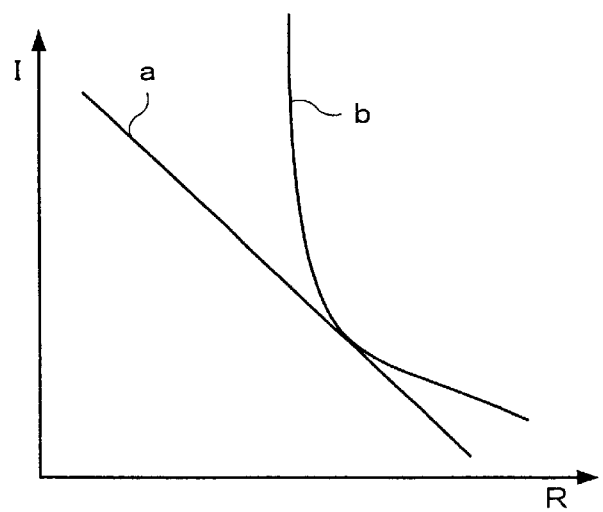
FIG. 14 is a characteristic diagram of an example of a photocoupler which is applied to the second invention.

FIG. 14 shows a characteristics diagram of an example of the photocoupler 203. In this diagram, an axis of ordinate indicates the current which is inputted to the light emitting diode 203a of the photocoupler 203. An axis of abscissa indicates an internal resistance (impedance) of the phototransistor 203b of the photocoupler 203. A characteristics curve a shown in FIG. 14 is an ideal characteristics curve and a characteristics curve b is an actual characteristics curve. In the embodiment, by using the characteristics of this photocoupler, the synthesis signal obtained by synthesizing the two signals is transmitted from the secondary side to the primary side. On the primary side which received the synthesis signal, the synthesis signal is separated and the switching unit 213 is controlled in accordance with the separated signals. An area of the A signal in FIG. 14 is an area which is used as an analog switching signal. An area of the B signal is an area which is used when the analog signal is transmitted.

Figure 15:
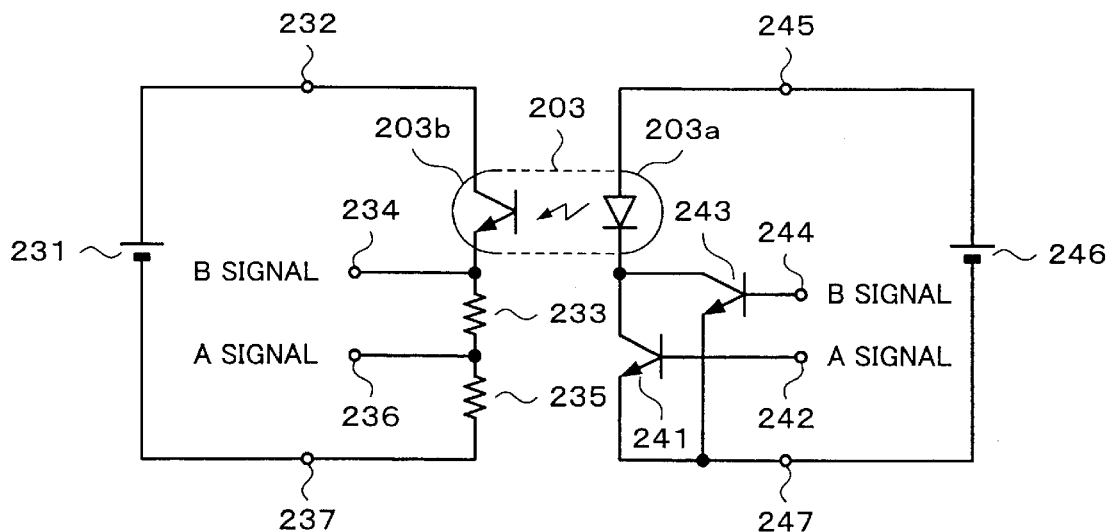
FIG. 15 is a schematic block diagram for explaining the second invention.

FIG. 15 shows an example in which the synthesis signal obtained by synthesizing the two signals is transmitted and received. On the primary side, the + side of a power source unit 231 is connected to a terminal 232 and a − side is connected to a terminal 237. A collector of the phototransistor 203b is connected to the terminal 232 and an emitter is connected to the terminal 237 through resistors 233 and 235. A terminal 234 is led out from the emitter of the phototransistor 203b and a terminal 236 is led out from a node of the resistors 233 and 235.

On the secondary side, an anode of the light emitting diode 203a is connected to a terminal 245 and a cathode is connected to a collector of an npn-type transistor 241 and a collector of an npn-type transistor 243. An emitter of the transistor 241 and an emitter of the transistor 243 are connected to a terminal 247. A terminal 242 is led out from a base of the transistor 241 and a terminal 244 is led out from a base of the transistor 243. A + side of a power source unit 246 is connected to the terminal 245 and a − side is connected to the terminal 247.

Figure 16:
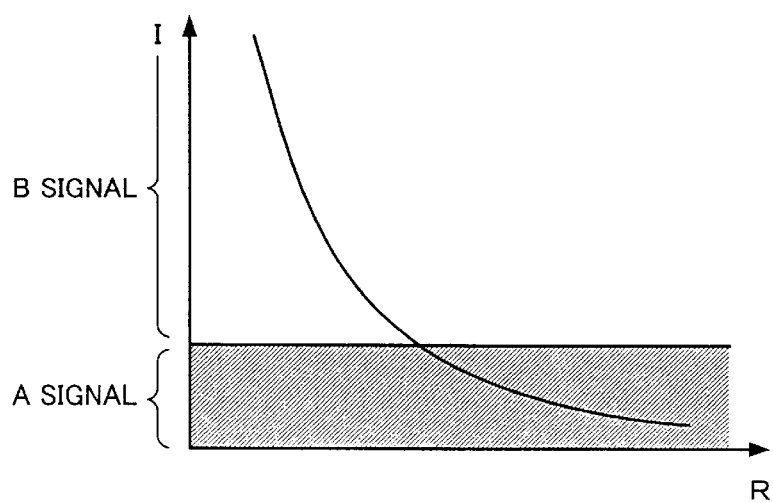
FIG. 16 is a characteristic diagram of an example of the photocoupler for explaining the second invention.

The A signal is inputted from the terminal 242. When the A signal is inputted, the transistor 241 is turned on. A current of 200 μA serving as an area of the A signal shown in FIG. 16 as an example flows in the light emitting diode 203a. When the light emitting diode 203a emits the light, the phototransistor 203b is turned on. At this time, when the current of 200 μA flows, as shown in FIG. 16, an internal resistance of the phototransistor 203b increases and, for instance, the current of 200 μA can be obtained from the terminal 234. Therefore, although the A signal can be derived from the terminal 234, the B signal cannot be obtained from the terminal 236.

The B signal is inputted from the terminal 244. When the B signal is inputted, the transistor 243 is turned on and, for instance, the current of 5 mA serving as an area of the B signal shown in FIG. 16 flows in the light emitting diode 203a. When the light emitting diode 203a emits the light, the phototransistor 203b is turned on. At this time, if the current of 5 mA flows, as shown in FIG. 16, the internal resistance of the phototransistor 203b decreases. For example, the current of 5 mA can be obtained from the terminal 236 and the current of 200 μA can be also obtained from the terminal 234. Therefore, the A signal can be derived from the terminal 234 and the B signal can be obtained from the terminal 236.

As mentioned above, when the A signal is inputted and the transistor 241 is turned on, a small signal is taken out from the resistors 233 and 235. When the B signal is inputted and the transistor 243 is turned on, the signal is separated by the resistors 233 and 235. The B signal cannot be transmitted unless the signal (current) is larger than the A signal as shown in FIG. 16. Since the perfect operation is executed when the signal changes from the A signal to the B signal, it is sufficient to use the signal as it is.

Figure 17:
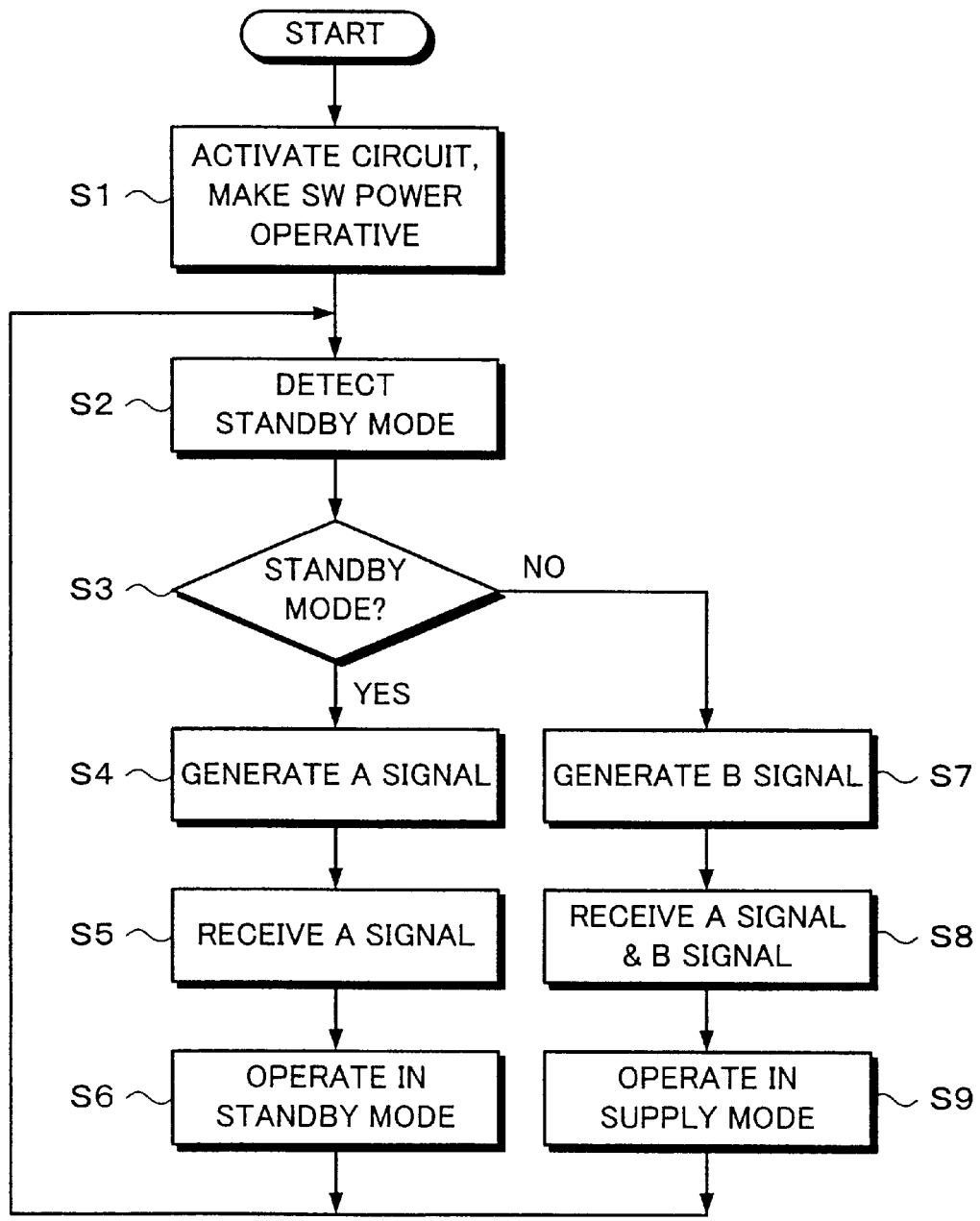
FIG. 17 is a flowchart for an embodiment to which the second invention is applied.

An example of an algorithm of the invention will now be described with reference to a flowchart shown in FIG. 17. In step S1, the circuit is activated and the switching power source is made operative. In step S2, the voltage detecting circuit 229 detects a voltage flowing in the loads connected to the output terminals To1" and To2", thereby discriminating whether the load has been connected or not, that is, whether the operating mode is the standby mode or the supply mode. In step S3, whether a detection result indicates the standby mode or not is discriminated. If it is determined that the operating mode is the standby mode, the processing routine advances to step S4. If it is determined that the operating mode is the supply mode, the processing routine advances to step S7.

In step S4, the A signal is supplied from the control circuit 226 to the signal transmitting circuit 227. In step S5, the A signal is received by the receiving circuit 217 through the photocoupler 203. When the A signal is received by the receiving circuit 217, in step S6, it is supplied to the on/off signal generating circuit 214 through the separating circuit 216 and the switching unit 213 operates in the standby mode. The processing routine is returned to step S2.

In step S7, the B signal is supplied from the signal synthesizing circuit 228 to the signal transmitting circuit 227. In step S8, the A signal and the B signal are received by the receiving circuit 217 through the photocoupler 203. When the A signal and the B signal are received by the receiving circuit 217, in step S9, they are supplied to the on/off signal generating circuit 214 and voltage/current control circuit 215 through the separating circuit 216.

At this time, when the A signal is received by the receiving circuit 217, the on/off signal generating circuit 214 is controlled through the separating circuit 216. The switching unit 213 operates in the standby mode with a suppressed electric power consumption. Further, when the B signal is received by the receiving circuit 217, the voltage/current control circuit 215 is controlled through the separating circuit 216. The switching unit 213 operates in the supply mode with a constant voltage and a constant current. When the B signal is transmitted from the secondary side, the A signal and the B signal are received on the primary side. When the A signal and the B signal are received, the operation in the standby mode is cancelled and the operation in the supply mode is preferentially executed. Therefore, in step S9, the switching unit 213 operates in the supply mode. When the control in step S9 is finished, the processing routine is returned to step S2.

In the embodiment, when the photocoupler 203 is turned on, the switching unit 213 operates and when the photocoupler 203 is turned off, the operation of the switching unit 213 is stopped. However, it is also possible to construct the apparatus in a manner such that when the photocoupler 203 is turned on, the operation of the switching unit 213 is stopped and when the photocoupler 203 is turned off, the switching unit 213 operates. However, when the photocoupler 203 is turned on, since the operation of the switching unit 213 is stopped, if the A signal and the B signal are transmitted from the secondary side to the primary side, the operation of the switching unit 213 is stopped.

Figure 18:
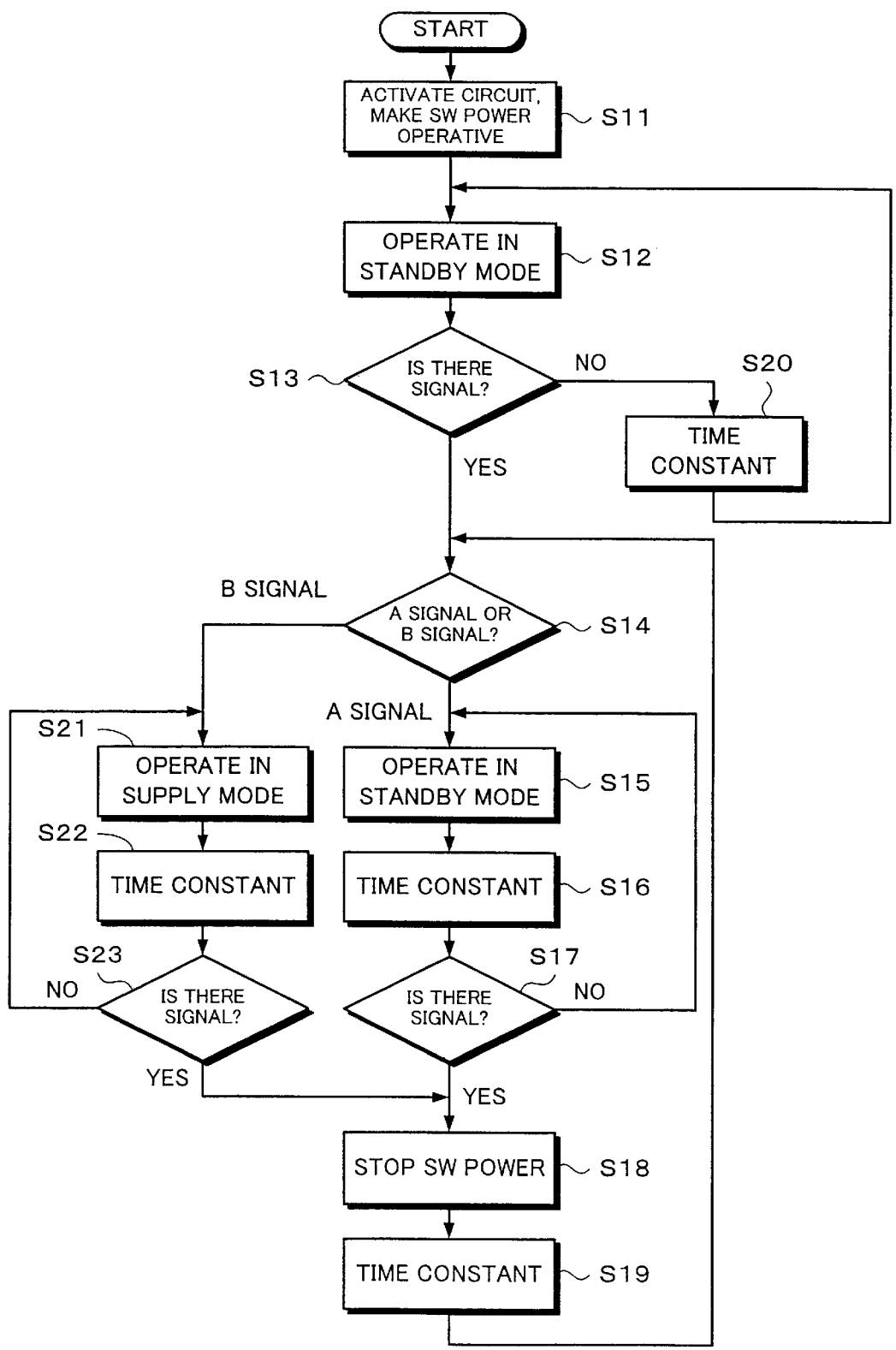
FIG. 18 is a flowchart for an embodiment to which the second invention is applied.

Therefore, an example of an algorithm such that even if the A signal and the B signal are transmitted and the photocoupler 203 is turned on, the operation of the switching unit 213 is not stopped will be described with reference to a flowchart of FIG. 18.

In step S11, the circuit is activated and the switching power source operates. In step S12, the switching unit 213 operates in the standby mode. In step S13, whether the signal is received by the receiving circuit 217 or not is discriminated. When the signal is received, the processing routine advances to step S14. When the signal is not received, the processing routine advances to step S20. In step S20, the processing routine is returned to step S12 after the elapse of a predetermined time constant.

In step S14, whether the received signal is the A signal or the B signal is discriminated. If it is determined that the received signal is the A signal, the processing routine advances to step S15. If it is decided that the received signal is the B signal, the processing routine advances to step S21. In step S15, the switching unit 213 operates in the standby mode. In step S16, the processing routine advances to step S17 after the elapse of a predetermined time constant. In step S17, the presence or absence of the A signal is discriminated. If it is decided that there is the A signal, step S18 follows. If it is decided that there is not the A signal, the processing routine is returned to step S15.

In step S21, the switching unit 213 operates in the supply mode. In step S22, the processing routine advances to step S23 after the elapse of a predetermined time constant. In step S23, the presence or absence of the B signal is discriminated. If it is decided that there is the B signal, step S18 follows. If it is decided that there is not the B signal, the processing routine is returned to step S21.

In step S18, the operation of the switching unit 213 is stopped. In step S19, the processing routine is returned to step S14 after the elapse of a predetermined time constant.

By the above operations, even if the B signal serving as a supply mode is supplied and the photocoupler 203 is turned on in the standby mode, the apparatus can operate without stopping the operation of the switching unit 213.

An example of an algorithm at the time when the B signal is supplied from the signal synthesizing circuit 228 to the signal transmitting circuit 227 will be described with reference to a flowchart of FIG. 19. In step S31, the B signal is supplied from the signal synthesizing circuit 228 to the signal transmitting circuit 227. In step S32, the A signal and the B signal are received by the receiving circuit 217. When the A signal and the B signal are received, in step S33, the signal is supplied to the voltage/current control circuit 215 through the separating circuit 216 as mentioned above. The switching unit 213 is controlled by the voltage/current control circuit 215. In step S34, the signal is delayed by the time constant Δt.

In step S35, whether the B signal has been received or not is discriminated. If it is determined that the B signal has been received, the processing routine is returned to step S33. If it is determined that the B signal is not received, the processing routine advances to step S36. In step S36, whether the A signal has been received or not is discriminated. If it is determined that the A signal has been received, the processing routine advances to step S37. If it is determined that the A signal is not received, the processing routine is returned to step S35. In step S37, the signal is supplied to the on/off signal generating circuit 214 through the separating circuit 216 and the switching unit 213 is controlled by the on/off signal generating circuit 214.

Figure 19:
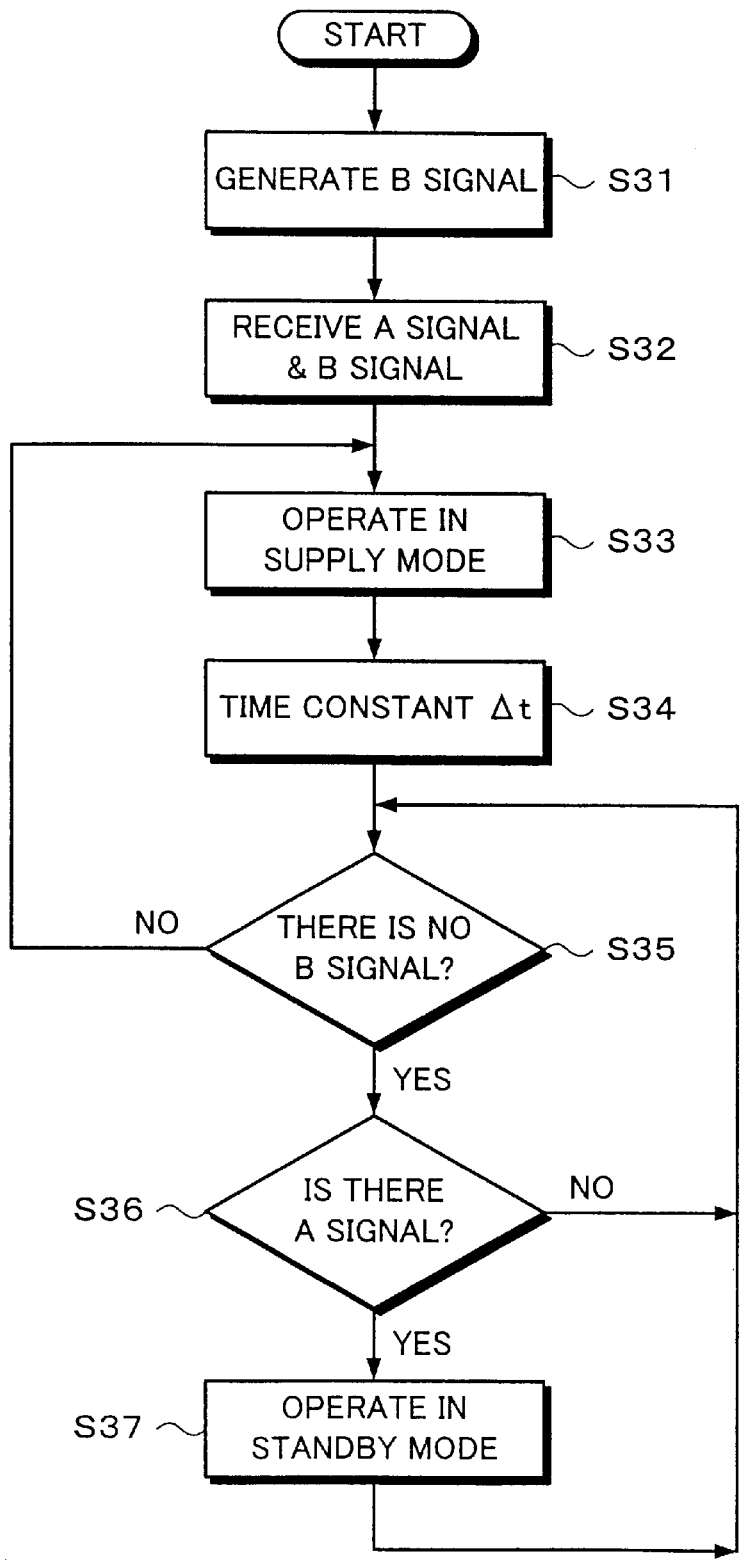
FIG. 19 is a flowchart for an embodiment to which the second invention is applied.

Although the B signal has been generated first in the flowchart shown in FIG. 19, the A signal can be also generated first.

In the embodiment, the switching unit 213 is controlled so as to temporarily stop the output of the output voltage when it is higher than a predetermined value.

As mentioned above, the signal in the supply mode in which the power source that is generated from the power source circuit is set to the constant voltage and the constant current and the signal in the standby mode in which the power source is set to the electric power in a small power mode can be realized by one photocoupler (feedback circuit).

In the embodiment, the transmission of the signal for suppressing the electric power consumption at the time when the power source circuit does not operate is stopped and the signal for making the apparatus operative as a supply mode and the signal for making the apparatus operative as a standby mode are transmitted. However, a signal for switching the voltage and current or electric power can be also transmitted.

In the embodiment, two signals of the A signal and the B signal are synthesized and the synthesis signal is transmitted and, after completion of the transmission, the synthesis signal is separated into the two signals. However, it is also possible to synthesize three or more signals, transmit the synthesis signal, and after completion of the transmission, separate the synthesis signal into three or more signals.

According to the first invention, the electric power consumption in the standby mode can be reduced. Further, even if the signal cannot be transmitted from the secondary side to the primary side due to a large load, the apparatus can be reactivated.

According to the second invention, the number of feedback circuits for transmitting the signal while holding the insulated state. Since the number of circuits for holding the insulated state can be reduced, the safer operation can be realized.

The present invention is not limited to the foregoing embodiments but many modifications and variations are possible within the spirit and scope of the appended claims of the invention.

What is claimed is:

1. A power supplying apparatus whose primary side and secondary side are insulated, comprising:

detecting means for detecting a mode of the secondary side;

signal transmitting means for transmitting a detection result of said detecting means to the primary side in the insulated state; and control means for switching a power generating mode and a power stop mode in accordance with said detection result received through said signal transmitting means, wherein the apparatus is controlled so that an operating mode is set to said power generating mode when there is a signal which is transmitted through said signal transmitting means and the operating mode is set to said power stop mode when there is not the signal which is transmitted through said signal transmitting means, and when said power stop mode continues for a long period of time, it is changed to said power generating mode.

2. A power supplying apparatus which can perform an intermittent oscillation to suppress an electric power consumption, wherein a primary side has:

time constant means which is set to a period longer than a period of the intermittent oscillation;

signal transmitting means for transmitting a signal from a secondary side; and switching means for controlling the apparatus so as to perform the intermittent oscillation in response to said received signal, and said secondary side has detecting means for detecting a state of a load which is connected.

3. An apparatus according to claim 2, wherein said secondary side further comprises:

rectifying means for rectifying a voltage and a current which are outputted;

voltage/current detecting means for detecting said voltage and/or said current which are/is outputted; and control means for controlling said transmission signal through said signal transmitting means on the basis of said detected voltage and/or said detected current.

4. An apparatus according to claim 2, wherein said time constant means comprises a diode and a capacitor, and when a voltage of said capacitor is equal to or less than a reference value, a switching operation of said switching means is performed.

5. An apparatus according to claim 2, wherein said secondary side further has a diode and a capacitor, and when a voltage of said capacitor is equal to or larger than a first reference value, the transmission of said signal to said primary side is stopped and, when the voltage of said capacitor is equal to or less than a second reference value, said signal is transmitted to said primary side.

6. A power supplying method for a power supplying apparatus whose primary side and secondary side are insulated, comprising the steps of:

detecting a mode of said secondary side;

transmitting a detection result to the primary side in the insulated state;

switching a power generating mode and a power stop mode in accordance with said transmitted and received detection result;

controlling the apparatus so that said power generating mode is set when there is a signal which is transmitted through signal transmitting means and said power stop mode is set when there is not the signal which is transmitted through said signal transmitting means; and changing said power stop mode to said power generating mode when said power stop mode continues for a long period of time.

7. A power supplying method which can perform an intermittent oscillation to suppress an electric power consumption, wherein on a primary side, a time constant is set to a period longer than a period of the intermittent oscillation, a signal which is transmitted from a secondary side is received, and a switching operation is performed so that said intermittent oscillation is performed in response to said received signal, and on said secondary side, a voltage and a current which are outputted are rectified, said voltage and/or said current which are/is outputted are/is detected, the signal is transmitted to said primary side, and said signal to be transmitted is controlled on the basis of said detected voltage and/or said detected current.

8. A power supplying apparatus whose primary side and secondary side are insulated, comprising:

detecting means for detecting a voltage and/or a current of the secondary side;

synthesizing means for synthesizing at least said two voltages and/or currents;

signal transmitting means for transmitting a synthesized synthesis signal to the primary side in the insulated state;

separating means for separating at least said two voltages and/or currents from said transmitted and received synthesis signal; and control means for controlling the operation of said primary side in accordance with each of at least said separated two voltages and/or currents.

9. An apparatus according to claim 8, wherein said synthesis signal is constructed at least a first current and a second current.

10. An apparatus according to claim 8, wherein the operation of said primary side is an operation according to a power standby mode, a power supply mode, or a power stop mode.

11. A power supplying method for a power supplying apparatus whose primary side and secondary side are insulated, comprising the steps of:

detecting a voltage and/or a current of the secondary side;

synthesizing at least said two voltages and/or currents;

transmitting a synthesized synthesis signal to the primary side in the insulated state;

separating at least said two voltages and/or currents from said transmitted and received synthesis signal; and controlling an operation on said primary side in accordance with each of at least said separated two voltages and/or currents.

* * * * *